United States Patent [19]
Kitano

[11] Patent Number: 5,744,193
[45] Date of Patent: Apr. 28, 1998

[54] METHOD OF MANUFACTURING AN OPTICAL DISC AND A PLACING PLATFORM TO BE USED BY THE SAME

[75] Inventor: Ryoko Kitano, Tokushima-ken, Japan

[73] Assignee: Kitano Engineering Co., Ltd., Komatsushima, Japan

[21] Appl. No.: 650,908

[22] Filed: May 17, 1996

[30] Foreign Application Priority Data

May 20, 1995 [JP] Japan .................................. 7-145231

[51] Int. Cl.[6] ........................................... G11B 7/26
[52] U.S. Cl. .............. 427/162; 118/52; 156/74.578; 427/207.1; 427/240; 427/296
[58] Field of Search ................. 156/74, 295, 578; 118/52; 369/286; 427/240, 207.1, 162, 296

[56] References Cited

U.S. PATENT DOCUMENTS

| | | |
|---|---|---|
| 4,877,475 | 10/1989 | Uchida et al. |
| 4,995,799 | 2/1991 | Hayashi et al. |
| 5,069,155 | 12/1991 | Kunze-Concewitz et al. ........... 118/52 |

FOREIGN PATENT DOCUMENTS

| | | |
|---|---|---|
| 61139956 | 6/1986 | Japan . |
| 1101124 | 4/1989 | Japan . |
| 4-53012 | 8/1992 | Japan . |
| 836786 | 2/1996 | Japan . |

*Primary Examiner*—Jeff H. Aftergut
*Attorney, Agent, or Firm*—Flynn, Thiel, Boutell & Tanis, P.C.

[57] ABSTRACT

A method of manufacturing an optical disc for uniformly spreading an adhesive at a region where the first and second resin substrates are bonded to each other at a portion close to central holes thereof, and a placing platform to be used by the same manufacturing method. The method of manufacturing the optical disc comprises coating the adhesive onto the first resin substrate, placing the second resin substrate on the first resin substrates, then spreading the adhesive while the first and second resin substrates are rotated at high speed, thereafter curing the adhesive thereby bonding the first and second resin substrates, wherein the adhesive is sucked from central holes of the first and second resin substrates so as to facilitate spreading of the adhesive at the central holes thereof. The placing platform of the optical disc to be used by the above method has a boss provided with suction means.

8 Claims, 10 Drawing Sheets

F I G. 4 (A)
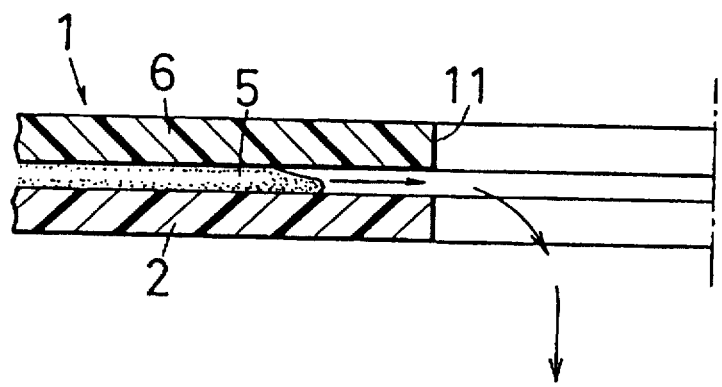
F I G. 4 (B)
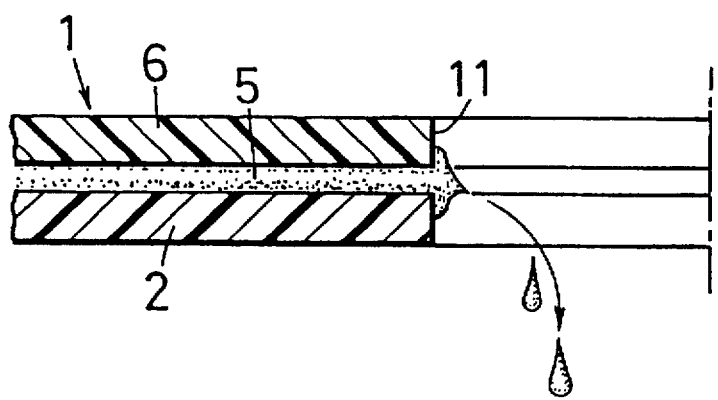

STEP (5)

STEP (4)

STEP (3)

STEP (2)

STEP (1)

METHOD OF MANUFACTURING AN OPTICAL DISC AND A PLACING PLATFORM TO BE USED BY THE SAME

BACKGROUND OF THE INVENTION

1. Field of the invention

The present invention relates to a method of manufacturing an optical disc and a placing platform to be used by the same.

2. Prior Art

Computers, especially personal computers have been widely spread recently, and hence storage medium to be used by such computers, partially, capacity of a storage disc has been in high density and various kinds of the storage discs are increased day by day. Further, CDs mainly for music tend to be developed lately to those for image. As the storage disc, there are, for example, a magnetic disc, an optical disc (e.g., CD ROM), an optical magnetic disc (e.g., MO). Among them, the demand for the optical disc is increased recently.

Some optical discs are standardized in sizes thereof so that the capacity thereof can be made in much high density. For example, each resin substrate constituting the optical disc has a thickness of 0.6 mm, an outer diameter thereof is 120 mm and an inner diameter of a central hole defined therein is 15 mm.

However, it is commonly practiced that two thin resin substrates each having the same thickness (0.6 mm) are bonded to each other since mechanical strength thereof is low and liable to be deformed. For example, FIG. 11 schematically shows a cross section of an optical disc formed of two pieces of discoid resin substrates (a first resin substrate 2 and a second resin substrate 6) which are bonded to each other, wherein FIG. 11(A) shows the optical disc having information signals which are stored in one of the resin substrates and FIG. 11(B) shows the optical disc having information signals which are stored in both resin substrates.

Described hereinafter is the optical disc having information signals which are stored in one of the resin substrates.

The first resin substrate 2 is formed of transparent polycarbonate resin by an injection molding machine. Bits representing binary unit of information, i.e., information signals such as voice are stored in one surface of the first resin substrate 2. A reflecting film 3 formed of aluminum or the like is formed on the surface on which information signals are stored (hereinafter referred to as signal surface), and a protecting film 4 such as an adhesive is provided on the reflecting film 3 for preventing the signal surface from being damaged.

Further, the second resin substrate formed of transparent polycarbonate which is the same as the first resin substrate 2 is bonded to the signal surface of the first resin substrate 2 by way of an adhesive 5.

It may be possible to bond the second resin substrate directly on the reflecting film 3 of the first resin substrate 2 without providing the protecting film 4 on the reflecting film 3 of the first resin substrate 2.

The following steps are necessary to be taken for bonding the first and second resin substrates set forth above.

(1) a step of placing the first resin substrate 2 on a placing platform 7, (2) a step of coating the adhesive 5 to the first resin substrate 2, (3) a step of laying the second resin substrate 6 on the first resin substrate 2 while the former is placed on the latter, (4) a step of spreading the adhesive 5 interposed between the first and second resin substrates, and (5) a step of curing the adhesives.

Briefly explaining, in a step of bonding the first and second resin substrates, firstly the first resin substrate 2 is placed on the placing platform 7, secondly the adhesives having flowability, e.g., ultra violet curing resin is coated on the first resin substrate 2, thirdly the second resin substrate 6 is placed on the first resin substrate 2 and they are laid on each other, fourthly the first resin substrate 2 and second resin substrate 6 are rotated while they are laid on each other so as to uniformly extend or spread the adhesive which is interposed therebetween. At this time, the resin 5 is scattered when it is spread, and air confined in the adhesive 5 interposed between the first and resin substrates is expelled outside.

Thereafter, the adhesive 5, which is uniformly spread between the first and second resin substrates, is cured while it is irradiated by UV rays. As a result, the bonding of the first resin substrate 2 and second resin substrate 6 is completed. In the fourth step of the five steps, when the adhesive is spread owing to the rotation of the first and second resin substrates, it is spread sufficiently at a region having the signal surface due to the centrifugal force but it is not sufficiently extended at a region close to central holes of the first and second resin substrates having no signal surface and air remains therebetween, leading to short of the spreading of the adhesive 5.

Considering the performance of the optical disc, the adhesive has to be extended thoroughly and uniformly between the first and second resin substrates having no signal surface at the centers thereof. The reason is that a spot is formed on the region having no signal surface when the adhesive is cured in a later step, leading to deterioration of beauty thereof and also leading to the lowering of strength at the bonding surfaces at the central holes thereof.

It is a big problem in improving the quality of the optical disc how the adhesive 5 is thoroughly and uniformly extended between the first and second resin substrates at the region where they are bonded to each other at the central holes thereof. However, there has not been proposed definite means for solving this problem.

SUMMARY OF THE INVENTION

The present invention has been made to solve the aforementioned problem.

That is, it is an object of the present invention to provide a method of manufacturing an optical disc for uniformly spreading an adhesive at a region where the first and second resin substrates are bonded to each other at a portion close to central holes thereof, and a placing platform to be used by the same manufacturing method.

To meet this object, the inventors of the prevent invention has devoted themselves to a research and they discovered that the adhesive was efficiently spread at the centers of the first and second resin substrates when negative pressure acts upon the centers thereof in a spreading step. The inventors completed the invention based on this discovery.

It is a first aspect of the invention to provide a method of manufacturing an optical disc comprising coating an adhesive onto a first resin substrate, placing a second resin substrate on the first resin substrate, then spreading the adhesive while the first and second resin substrates are rotated at high speed, finally curing the adhesive thereby bonding the first and second resin substrates, wherein the adhesive is sucked from central holes of the first and second resin substrates so as to facilitate the spreading of the adhesive at the central holes thereof in a step of spreading the adhesive.

In a first modification of the first aspect of the invention, the adhesive is sucked in such a manner that a boss having suction ports at the outer periphery thereof is inserted into the central holes of the first and second resin substrates so as to suck the adhesive from the central holes. In a second modification of the first aspect of the invention, the adhesive is also sucked by introducing the atmosphere from the upper and lower surfaces of both resin substrates through a gap defined between the outer periphery of the boss and the central holes of both resin substrates. In the first or second modification, suction strength is so large as to stop the adhesive at liquid stop grooves defined in both resin substrates.

It is a second aspect of the invention to provide a placing platform of an optical disc to be used by a method of manufacturing the optical disc comprising coating an adhesive onto a first resin substrate, placing a second resin substrate on the first resin substrate, thereafter curing the adhesive so as to bond the first and second resin substrates, wherein the placing platform has a boss provided with suction means.

In a first modification of the second aspect of the invention, the placing platform includes a boss having suction ports and a suction passage which communicates between the suction ports and a suction source. In a second modification of the second aspect of the invention, the boss detachably attached to the placing platform.

In a third modification of the second aspect of the invention and its first modification, a dome body is arranged around the placing platform so as to prevent the adhesive from being scattered around the placing platform. In a third modification of the second aspect of the invention and its first modification, a recess is provided on the placing platform around the boss so as to communicate with the atmosphere.

When the present invention adopts the method of manufacturing the optical disc and the placing platform to be used by the same method, the adhesive is sucked through the central holes of both resin substrates, thereby facilitating the spreading of the adhesive at the central holes thereof.

BRIEF DESCRIPTION OF THE DRAWINGS

FIG. 4 is a view showing the sucking operation of the adhesive;

FIG. 5 is a view showing the sucking operation of the adhesive, wherein

FIG. 6 is a view showing a placing platform, wherein

FIG. 8 is a view showing the sucking operation of the adhesive, wherein

PREFERRED EMBODIMENT OF THE INVENTION

Figure 1:
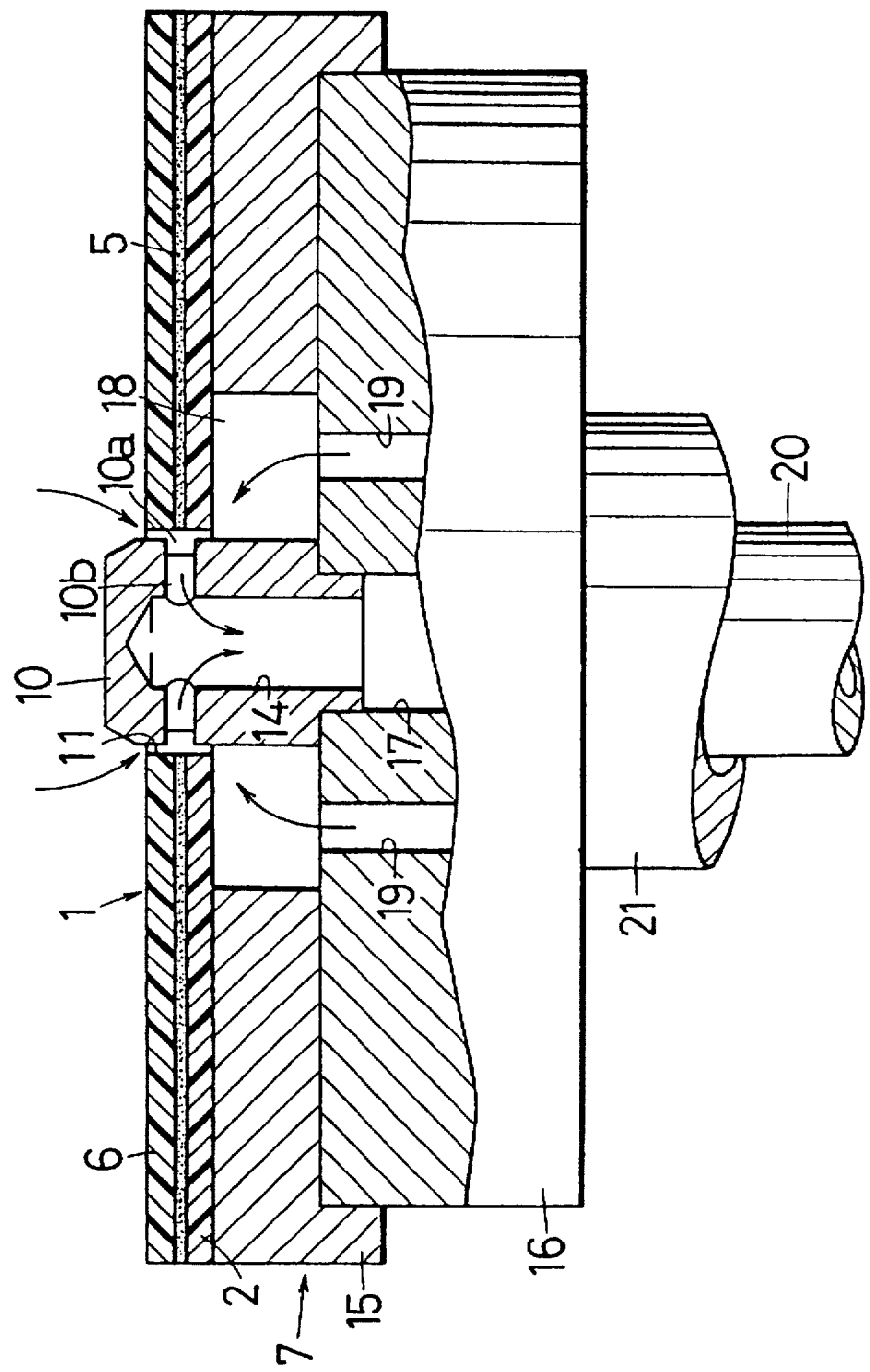
FIG. 1 is a cross sectional view showing a state where both resin substrates bonded to each other by way of an adhesive are placed on a placing platform.

A method of manufacturing an optical disc generally comprises a step of forming a first resin substrate by an injection molding machine using a stamper of an optical disc manufactured in a mastering step, a step of forming a reflecting film and a protecting film on a signal surface of the first resin substrate, and a step of bonding a second resin substrate on the signal surface of the first resin substrate.

The method of manufacturing the optical disc according to the present invention belongs to the step of bonding the second resin substrate on the first resin substrate, particularly, it relates to a step of spreading the adhesive in the step of bonding the first and second resin substrates.

First of all, there is described a schematic step (see to FIG. 10) of bonding the second resin substrate on the first resin substrate by way of the adhesive, e.g., a UV curing resin 5.

In step (1), a first resin substrate 2 having a signal surface on which a reflecting film and a protecting film are coated is uniformly sucked to and held by a placing platform 7.

In step (2), the UV curing resin 5 is discharged through the discharge port of a discharge nozzle 8 while the placing platform 7 on which the first resin substrate 2 is placed is rotated at low speed. As a result, when the UV curing resin 5 is coated on the first resin substrate 2 when it is discharged through the discharge nozzle 8, a circular track is drawn on the first resin substrate 2.

In step (3), a transparent second resin substrate 6 is placed on the UV curing resin 5 by a robotic hand, etc. upon completion of the coating UV curing resin 5.

It is preferable that the second resin substrate 6 sequentially contacts the UV curing resin 5 while directing from the center to the periphery thereof when the second resin substrate 6 is placed on the UV curing resin 5.

In step (4), the UV curing resin 5 interposed between the first resin substrate 2 and second resin substrate 6 is spread so as to be extended uniformly therebetween, and air interposed between both resin substrates and bubbles contained in the UV curing resin 5 are respectively expelled.

More in detail, the placing platform 7 is rotated at high speed (normally the number of rotation is more than several thousands rpm and rotating time is about several seconds) while the first resin substrate 2 and second resin substrate 6 are laid on each other.

As a result, air interposed between both bonded resin substrates and the bubbles contained in the UV curing resin 5 are expelled outward together with the surplus UV curing resin 5 owing to the centrifugal force, and at the same time the spreading of the UV curing resin 5 is facilitated. At the same time when the UV curing resin 5 is sucked through the central holes of the first and second resin substrates, the spreading of the UV curing resin 5 is also facilitated. The spreading step will be described in detail later.

Figure 10:
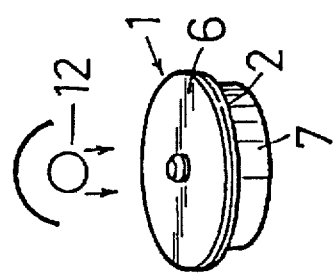
FIG. 10 is a schematic view showing a step of bonding a second resin substrate to a first resin substrate by way of the adhesive.
Figure 10:
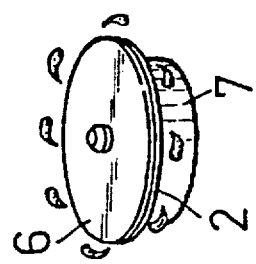
Figure 10:
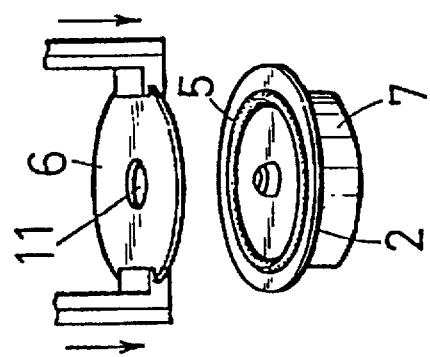
Figure 10:
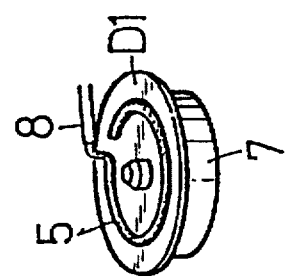
Figure 10:
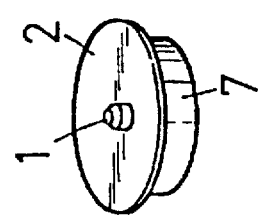
Figure 11A:
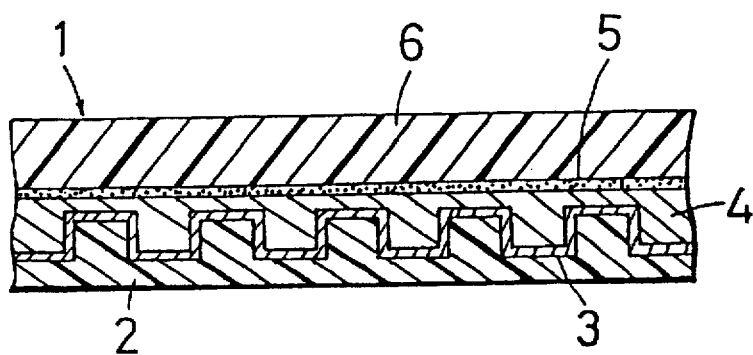
FIG. 11 is a cross sectional view of an optical disc showing a state where two pieces of the first and second resin substrates are bonded to each other.
Figure 11B:
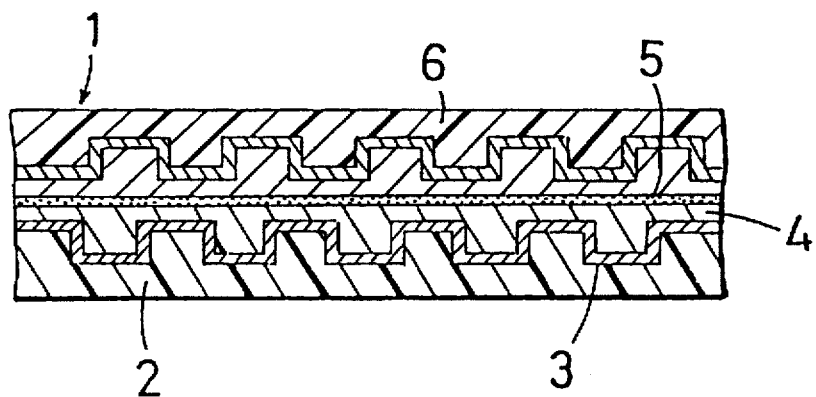

In step (5), the UV curing resin 5 is irradiated by UV rays to be cured while the first resin substrate 2 and second resin substrate 6, which are laid on and bonded to each other to be integrated with each other, are rotated (e.g., normally about several rpm) or not rotated. In this case, when both resin substrates 2 and 6 are directly irradiated by the UV curing resin 5 emitted from a UV light source 12 from the upper or lower direction thereof or from both upper and lower directions thereof. In FIG. 10, the second resin substrate 6 is irradiated by UV rays from the upper direction thereof. Concretely the UV light source 12 having a reflecting mirror at the back thereof is used to perform the irradiation effectively.

It is more preferable that a reflecting mirror, not shown, is disposed aslant (e.g., 45 degrees) around the bonded first and second resin substrates. Accordingly both resin substrates can be effectively heated and cured at the peripheries thereof.

When the adhesive resin is of a hot melt type, it is cured without being irradiated by UV rays. In the same step (5), there is taken a step of moving both resin substrates at constant speed through UV rays region which is emitted from the UV light source 12. As a result, the step of bonding both resin substrates is completed, thereby manufacturing the optical disc comprising two pieces of integrated resin substrates.

Figure 2:
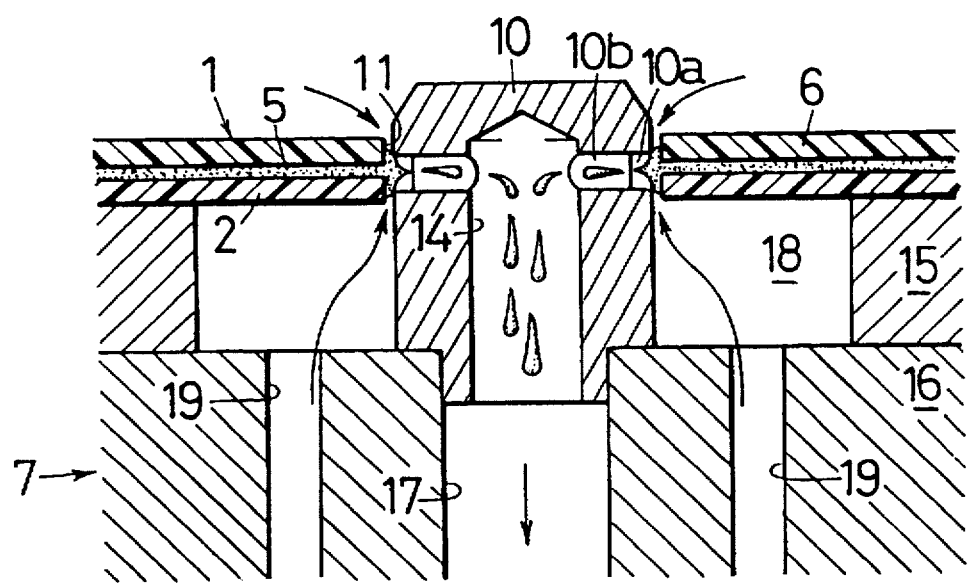
FIG. 2 is a view showing a state where the adhesive is sucked by a boss.
Figure 3:
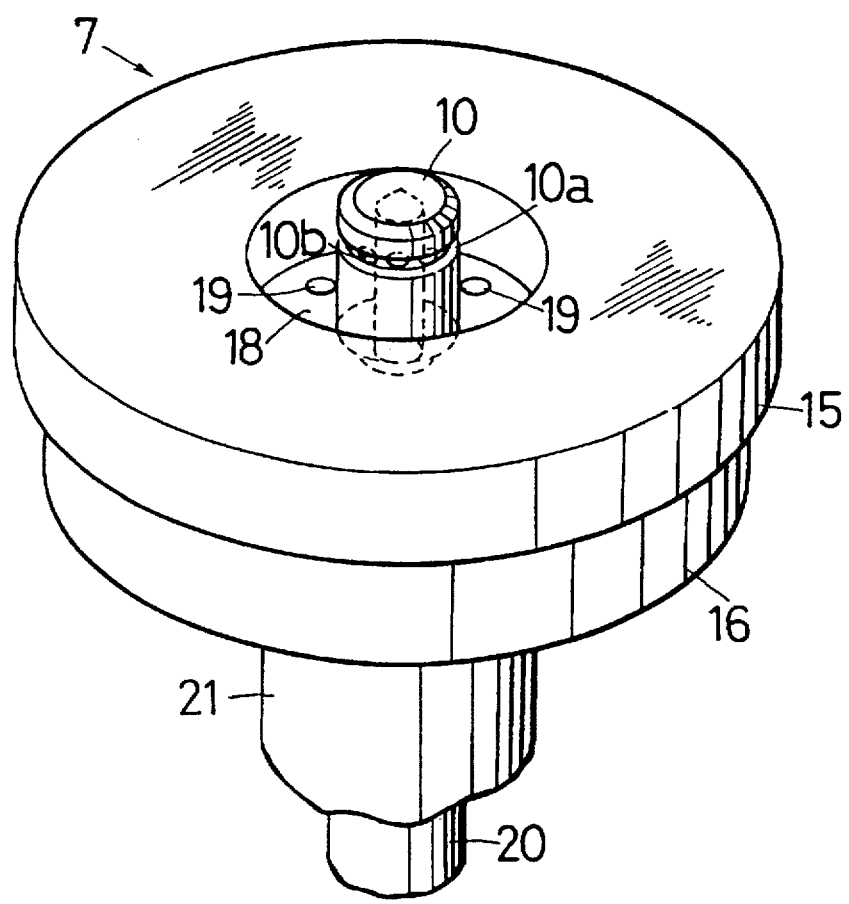
FIG. 3 is a perspective view of an entire placing platform.

FIG. 1 is a cross sectional view showing a state where both resin substrates, which are bonded to each other by an adhesive, e.g., UV curing resin, are placed on a placing platform. FIG. 2 is a view showing a state where a UV curing resin is sucked through a boss which is inserted into central holes of both resin substrates, and FIG. 3 is an entire perspective view of the placing platform.

As shown in FIG. 1, the placing platform 7 comprises a placing body 16, a table 15 attached onto the placing body 16 and a boss 10 to be attached to the placing body 16. The entire placing platform 7 is rotatable by a rotary shaft 20 which extends to the placing body 16 and is integrated with the placing platform 7. The rotary shaft 20 is supported by a fixed shaft 21 having a bearing therein.

The placing body 16 has a suction passage 17 at the center thereof, and the suction passage 17 is connected to a suction source, not shown, through the interior of the rotary shaft 20 extended to the placing body 16. The placing body 16 has a plurality of communication holes 19 which communicate with the atmosphere. The table 15 is fixed to the placing body 16 when the former is engaged with the latter from the upper portion of the latter. The table 15 has a flat seat surface on which both resin substrates 1 are placed and also has a large diameter through hole 18 which communicates with the communication holes 19. Suction holes, not shown, are provided on the seat surface of the table 15 to permit the first and second resin substrates not to move on the table 15.

The boss 10 is engaged with and fixed to the upper end of the suction passage 17 provided at the center of the placing body 16. At this time, the boss 10 is bonded to the placing body 16 using an adhesive such as a paste to maintain hermeticity with respect to the placing body 16. Accordingly, the boss 10 can be easily detachable when replaceable with another one. In a state where the table 15 is engaged with the placing body 16, the top of the boss 10 is slightly projecting from the seat surface of the table 15. When the first resin substrate 2 and second resin substrate 6 are placed on the seat surface of the table 15, the projected boss 10 is inserted into central holes 11 defined in both resin substrates 1.

Meanwhile, the boss 10 has a sucking function, and hence it has suction means including a ring groove 10a, etc. The suction means comprises the ring groove 10a defined in the outer circumference of the boss 10, a plurality of suction ports 10b provided on the bottom of the ring groove 10a, and a suction passage 14 formed inside the boss 10, a suction passage 17 provided inside the placing body 16, and a suction source, not shown, to which the suction passage 17 is connected by way of the rotary shaft 20. Suction operation can be performed through the ring groove 10a of the boss 10 in a state where the boss 10 is inserted into the central holes 11 of both resin substrates 1.

Meanwhile, in a state where both resin substrates 1 are placed on the table 15, a recessed space is formed by the large diameter penetration hole 18 at the periphery of the boss 10. The reason why the recessed space is defined is that fresh air is introduced through the lower surfaces of both resin substrates 1 when the adhesive 5 is sucked through the ring groove 10a after both resin substrates 1 are placed on the seat surface of the table 15.

Although the placing platform 7 has a structure set forth above, a circular dome body X is disposed around the placing platform 7 for receiving the scattered adhesive 5 to prevent it from being scattered outward since the adhesive 5 is scattered outward from both resin substrates 1 owing to the centrifugal force in a spreading step, described later.

Figure 6A:
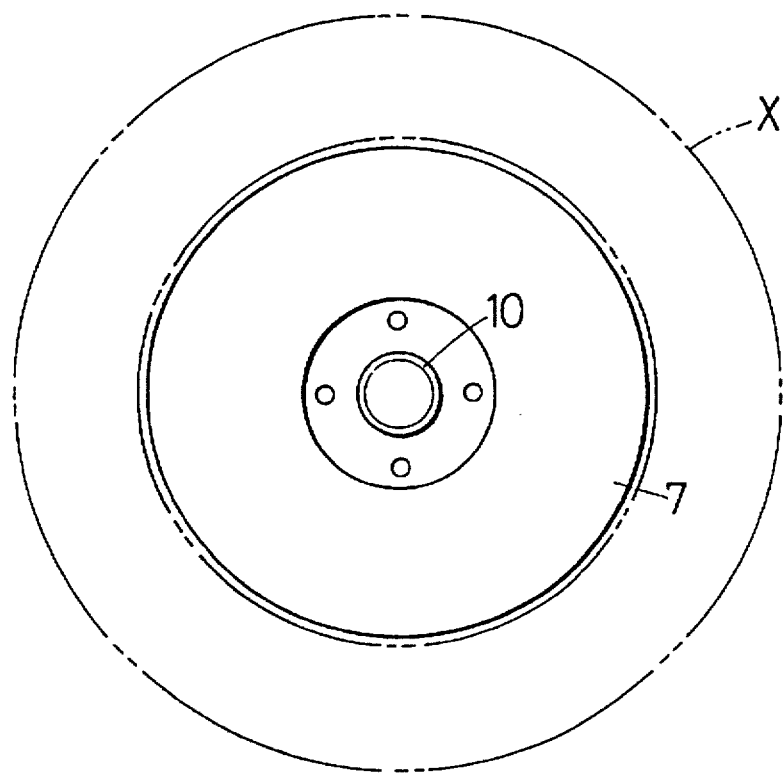
FIG. 6(A) is a plan view and FIG. 6(B) is a side view.
Figure 6B:
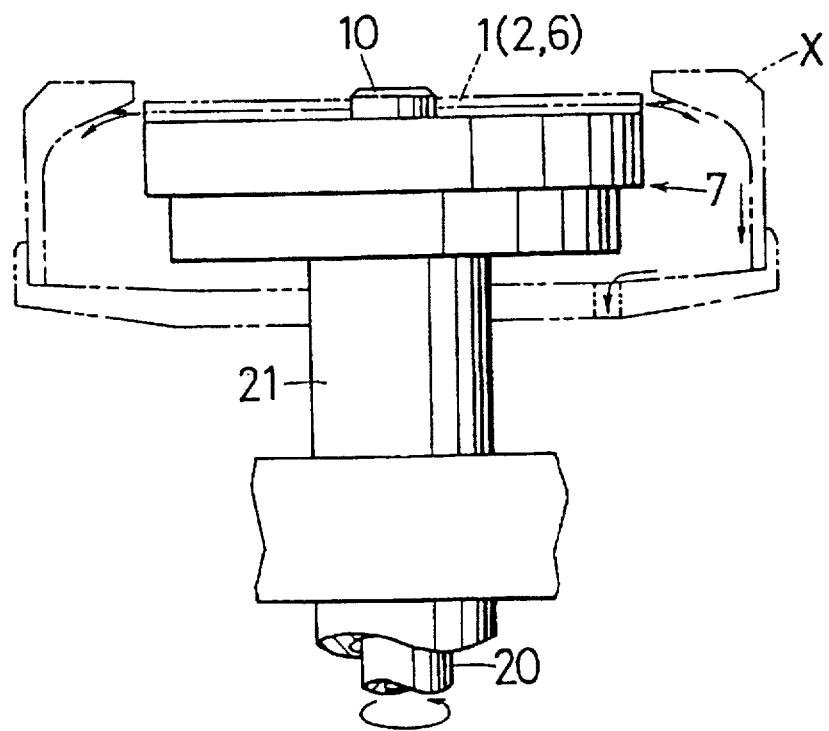

FIG. 6 shows a relation between the placing platform 7 and the dome body X, wherein FIG. 6(A) is a plan view and FIG. 6(B) is a side view.

The spreading step will be described now in detail.

The spreading step facilitates the spreading of the adhesive 5, e.g., the UV curing resin 5 interposed between both resin substrates 1 in a state where the placing platform 7 is rotated at high speed so as to extend the UW curing resin 5 thoroughly and uniformly, and also expels air contained in bubbles inside the LTV curing resin 5.

As shown in FIG. 1, the second resin substrate 6 is placed on the first resin substrate 2, which was previously placed on the placing platform 7, by way of the UV curing resin 5.

In this state, when the placing platform 7 is rotated at high speed, the UV curing resin 5 interposed between the first resin substrate 2 and second resin substrate 6 is spread and the surplus UV curing resin 5 is scattered outward. At the same time, air interposed between both resin substrates 1 is also expelled outward owing to the centrifugal force.

In this case, the UV curing resin 5 is prevented from being scattered by the dome body X which is disposed around the placing platform 7. The UV curing resin 5 received by the dome body X is collected by way of a discharge port as shown by arrows.

Since the suction source (e.g., a vacuums suction device), not shown, is operated at roughly the same time when the placing platform 7 is rotated at high speed, ambient air around the ring groove 10a is sucked sequentially through a plurality of suction ports 10b and the suction passages 14 and 17.

With such a sucking operation, pressure inside the ring groove 10a is lower than the atmosphere, namely, air inside the ring groove 10a is negatively pressurized.

The UV curing resin 5 interposed between both resin substrates 1 as shown in FIG. 2 is sequentially sucked through the ring groove 10a, a plurality of suction ports 10b, and the suction passages 14 and 17.

At this time, fresh air which is sucked from the upper surface of the optical disc passes through a gap between the first resin substrate 2 and boss 10 and is introduced into the suction ports 10b while fresh air sucked from the lower surface of the optical disc (introduced through the communication holes 19) passes through a gap between the second resin substrate 6 and the boss 10, then it is introduced through the suction ports 10b.

Suction operation and suction manner of the UV curing resin 5 interposed between both resin substrates 1 in the spreading step will be described now in detail.

The adhesive, i.e., UV curing resin 5 to be used in the spreading step has constant flowability. The placing platform 7 is actuated so as to be rotated at high speed and at the same time the suction source is operated so that the suction operation starts through the ring groove 10a of the boss 10 (see to FIG. 4(A)). The UV curing resin 5 interposed between both resin substrates 1 is spread and at the same time it flows toward the central holes 11 by this suction operation.

Figure 5A:
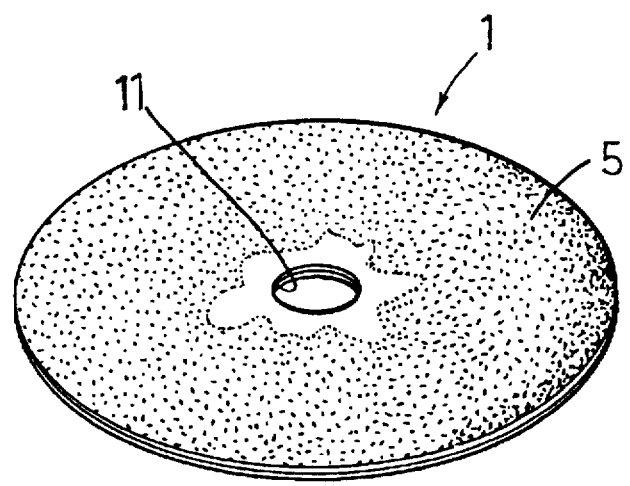
FIG. 5(A) shows a state before the adhesive is sucked and FIG. 5(B) shows the state after the adhesive is sucked.

In this first state, the UV curing resin 5 which exists at a portion close to the central holes 11 of both resin substrates 1 represents irregular spot comprising an air portion and a resin portion when viewed from the above as shown in FIG. 5(A). FIG. 5 shows, for convenience of explanation, a state where the second resin substrate 6 is transparent so that the UV curing resin 5 is seen through the second resin substrate 6. When the suction operation is performed, the UV curing resin 5 is gradually sucked out from the bonding surfaces of both resin substrates 1 at the central holes 11 so that the UV curing resin 5 is extended toward the entire central portion (see to FIG. 4 (B)).

Figure 5B:
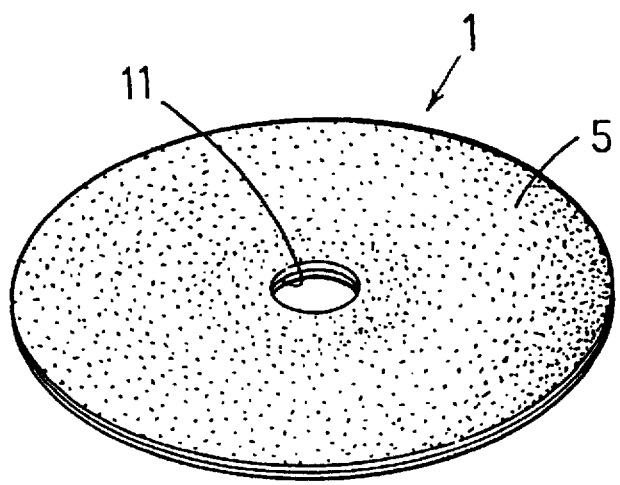

At this time, the UV curing resin 5 is sucked and leaked out from the bonding surfaces of resin substrates 1 at the central holes 11 flows upward or downward together with fresh air as shown in FIG. 2, and hence it is further sucked from the ring groove 10a of the boss 10 through the plurality of suction ports 10b. In this suction operation, the UV curing resin 5 which exists at a portion close to the central holes of both resin substrates 1 is changed to a state where the spot is disappeared and the UV curing resin 5 is thoroughly and uniformly extended as shown in FIG. 5(B). The rotation of the placing platform and the suction of the UV curing resin 5 are stopped, thereby completing the spreading step.

In the suction operation as shown in FIGS. 2 and 4 as set forth above, the UV curing resin 5 is strongly sucked until it is expelled outward from the central holes 11, and the expelled UV curing resin 5 is taken in the boss 10. The suction operation through the boss 10 is needed to be changed in its manner depending on the kinds of optical discs.

For example, in the case of an optical disc having ring-shaped liquid stop grooves P formed on the bonding surfaces of both resin substrates 1, the suction force can be adjusted until the UV curing resin 5 stops at the liquid stop grooves P.

Figure 7:
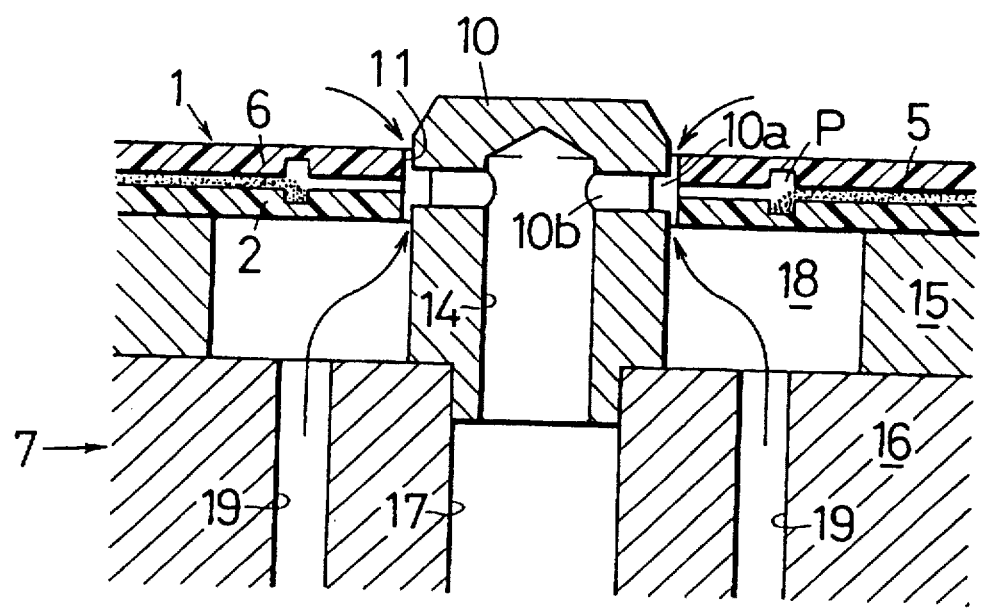
FIG. 7 is a view showing a state where the adhesive is sucked by a boss.

FIG. 7 shows a state of suction at that time when the UV curing resin 5 is not taken in the boss 10 even if it is sucked through the boss 10.

Figure 8A:
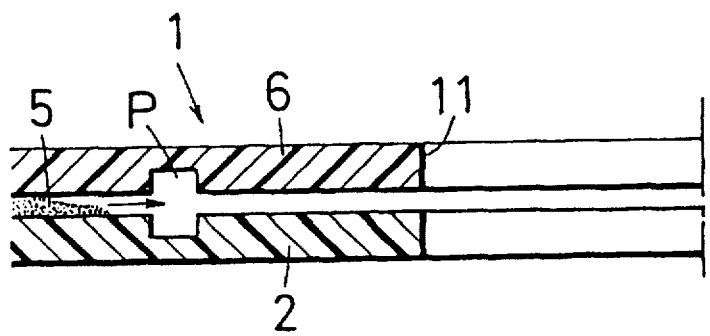
FIG. 8(A) shows a state before the adhesive is sucked and FIG. 8 (B) shows a state after the adhesive is sucked.
Figure 8B:
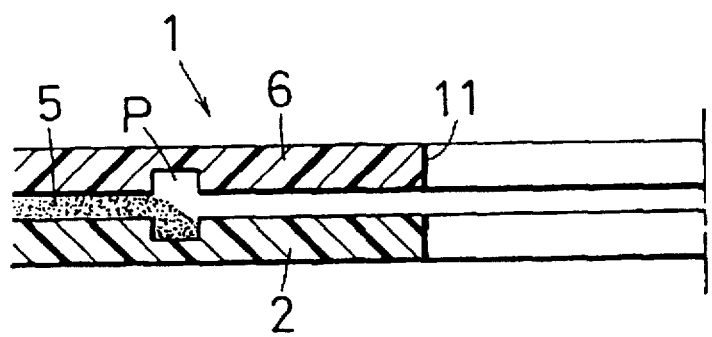

As shown in FIG. 8(A), the UV curing resin 5 is sucked in a direction of an arrow, then it stops at the liquid stop grooves P as shown in FIG. 8(B). As a result, the UV curing resin 5 is formed like a ring along the liquid stop grooves P at the inner boundary thereof.

Figure 9:
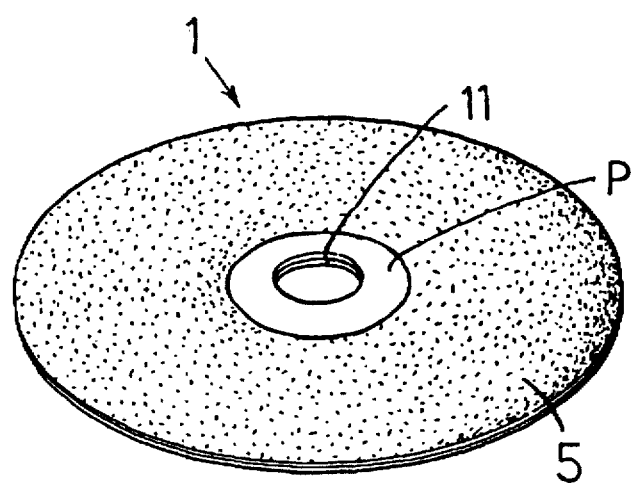
FIG. 9 is a view showing a state where the adhesive is sucked, wherein the adhesive is stopped at liquid stop grooves.

FIG. 9 shows, for convenience of explanation, a state where the second resin substrate 6 is transparent so that the UV curing resin 5 is seen through the second resin substrate 6.

When the suction operation through the boss 10 is adjusted in its strength, the spreading of the UV curing resin 5 can be changed to any degree.

Although the present invention is described with reference to preferred embodiments as set forth, it is not limited to those embodiments but can be changed variously without deviating from the essence of the present invention.

For example, although the placing platform is structured by combining separate placing body and table, but they can be formed integrally. Further, the shape of the boss can be changed to some extent so long as it has sucking function and can be attached to the placing platform.

The adhesive to be used in the present invention does not care the kinds thereof if it can bond the first and second resin substrates.

According to the present invention, it is needless to say that information signals can be stored in the following cases, namely, the first case is that information signals are stored in the first resin substrate and they are not stored in the second resin substrate, the second case is the information signals are stored in the second resin substrate and they are not stored in the first resin substrate, and the third case is that the information signals are stored in both resin substrates.

According to the present invention, it is possible to extend the adhesive thoroughly and uniformly between the entire bonding surfaces of both resin substrates, and also possible to expel bubbles interposed between the bonding surfaces outward. Particularly, it is expected that the adhesive can be uniformly spread at a portion close to the central hole of the optical disc, and it is possible to manufacture the optical disc of high quality. As a result, the optical disc thus manufactured is improved in beauty at the portion close to the central hole thereof and is strong in its bonding strength.

What is claimed is:

1. A method of manufacturing an optical disc having first and second resin substrates each with a central hole therethrough and having uncured adhesive in a space between the first and second resin substrates, comprising the steps of:

placing the optical disc on a placing platform so that the optical disc is supported thereon;

inserting a boss into aligned central holes in the first and second resin substrates so that a gap is defined between a peripheral surface of the boss and an inner edge of each of said first and second resin substrates;

orienting suction openings oriented around a periphery of the boss adjacent a radially inner edge of a space between said first and second substrates occupied by the uncured adhesive; and rotating the first and second resin substrates to effect a radially outward spreading of the uncured adhesive while simultaneously drawing ambient air through the gaps and into the suction openings to effect a pressure reduction thereat and a radially inward spreading of the uncured adhesive.

2. The method according to claim 1, wherein the pressure reduction is sufficient to effect a stoppage of the radially inward spreading of the adhesive at liquid stop grooves provided in the first and second resin substrates.

3. A placing platform arrangement for supporting an optical disc having first and second resin substrates each with a central hole therethrough and having uncured adhesive in a space between the first and second resin substrates, comprising:

a table having a support surface thereon adapted to support the first resin substrate thereon, the table having means defining an opening therein;

a hollow boss mounted on said table so as to be oriented in the first central hole of the first resin substrate, an interior of the hollow boss being connected to the opening in said table, the boss having suction openings oriented around a periphery of the boss adjacent a radially inner edge of the first resin substrate and connected to the hollow interior of the boss;

rotation means for simultaneously rotating the first and second resin substrates to effect a radially outward spread of the uncured adhesive in a space between the first and second resin substrates; and suction means for effecting a pressure reduction at a radially inner edge of the space between the first and second resin substrates and a radially inward spread of the uncured adhesive.

4. The placing platform according to claim 3, wherein the suction openings in the boss are defined by a radially outwardly opening annular groove in the boss oriented coplanar to a gap between the first and second resin substrates and in which is oriented the uncured adhesive, and by plural arcuately spaced holes in a bottom of the annular groove to connect the annular groove to the interior of the hollow boss.

5. The placing platform according to claim 3, wherein the boss is detachably mounted onto the table.

6. The placing platform according to claim 3, further comprising a dome body arranged around a periphery of the table to collect adhesive.

7. The placing platform according to claim 3, wherein a clearance gap exists between the periphery of the boss and the central holes in each of the first and second resin substrates; and wherein the suction means effects a drawing of ambient air through the respective gaps into the suction openings.

8. The placing platform according to claim 7, wherein the table includes an annular recess communicating with the opening in the table through which ambient air is drawn by the suction means through the gap between the boss and the first central hole.

* * * * *